Figure 1:
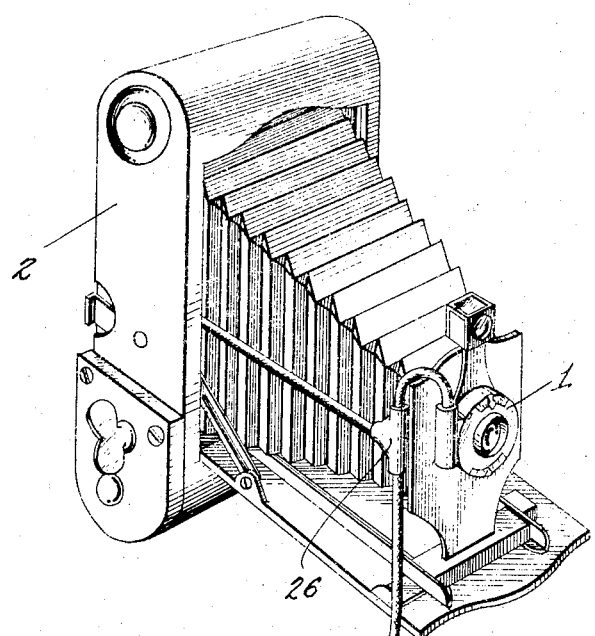

M. L. DUMAREST AND C. D. FISCHER.
ATTACHMENT FOR CAMERAS.
APPLICATION FILED NOV. 22, 1917.

1,326,038.

Patented Dec. 23, 1919.
2 SHEETS—SHEET 1.

Witnesses

Inventor
M. L. Dumarest &
C. D. Fischer
By Charles Chandler
Attorney

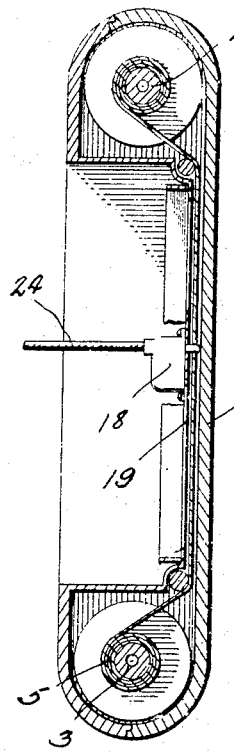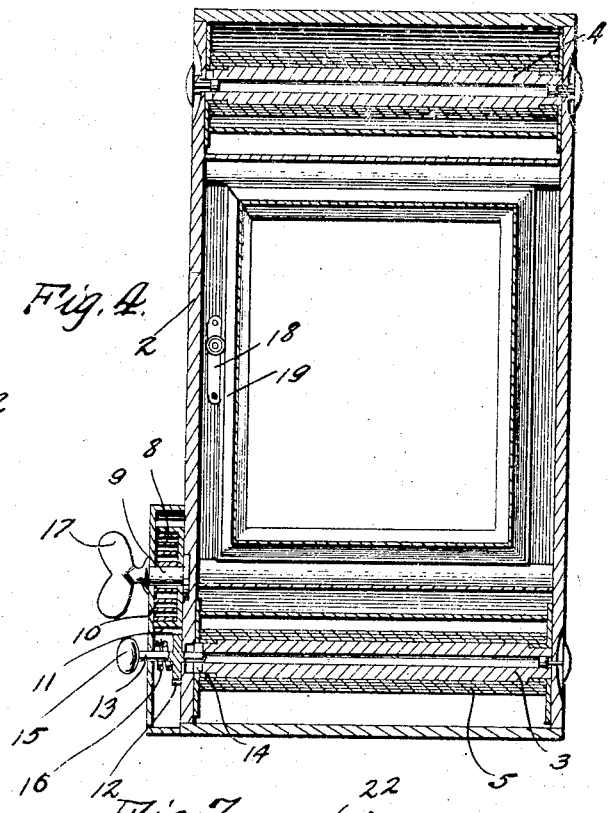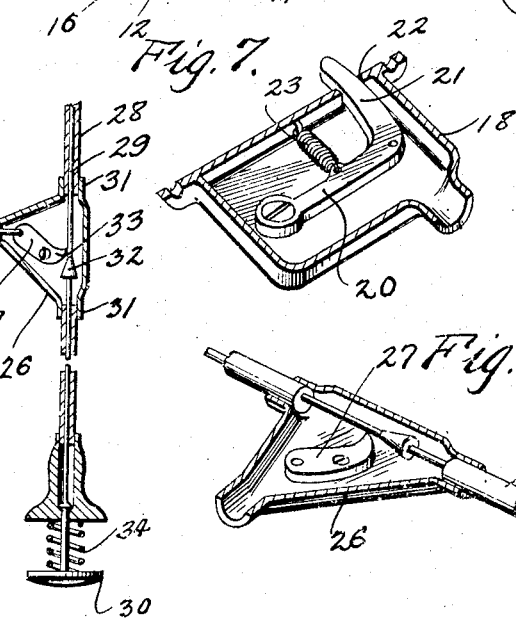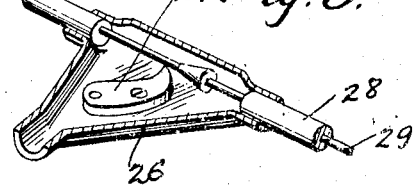

UNITED STATES PATENT OFFICE.

MICHAEL L. DUMAREST AND CHARLES D. FISCHER, OF FOLSOM, NEW MEXICO.

ATTACHMENT FOR CAMERAS.

1,326,038.　　　　　Specification of Letters Patent.　　Patented Dec. 23, 1919.

Application filed November 22, 1917. Serial No. 203,448.

*To all whom it may concern:*

Be it known that we, MICHAEL L. DUMAREST and CHARLES D. FISCHER, citizens of the United States, residing at Folsom, in the county of Union, State of New Mexico, have invented certain new and useful Improvements in Attachments for Cameras; and we do hereby declare the following to be a full, clear, and exact description of the invention, such as will enable others skilled in the art to which it appertains to make and use the same.

This invention relates to cameras, and has particular reference to automatic film spacing devices for cameras, in which film rolls are employed.

The primary object of the invention is to provide a mechanism for moving a photographic film step by step in an automatic manner so as to bring successive exposure sections into position, the step by step progression being effected as a result of and subsequent to the action of the exposure bulb or other exposure mechanism.

More particularly defined, it is the object of the invention to provide a film strip with a series of stop elements, together with a locking device which will successively engage the stop elements as the film strip is automatically drawn across the exposure opening, the locking device being automatically retracted by the action of exposing the film so as to permit the movement of the film for another space.

With the above objects in view, and such others relating to the details of construction, as may hereinafter appear, our invention will now be fully set forth and described, reference being had to the accompanying drawings.

In the drawings:—

Figure 2:
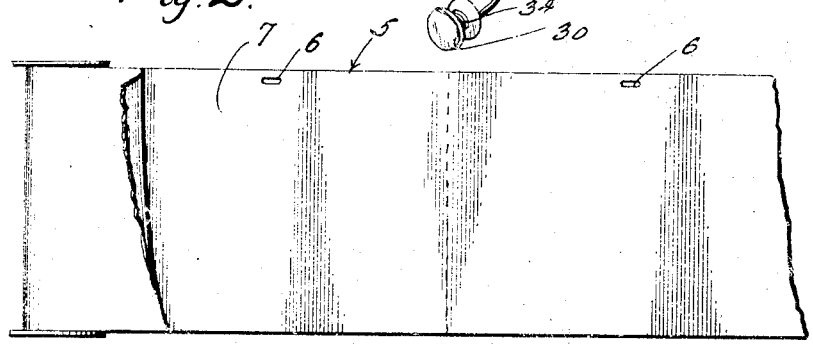
Figure 5:
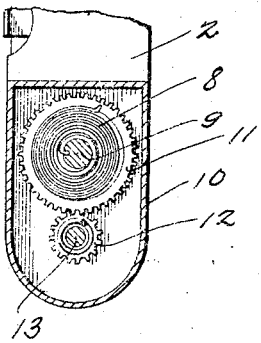

Figure 1 is a perspective view of a camera having our invention applied thereto, Fig. 2 is an elevation of a fragment of a film strip prepared in accordance with our invention, Fig. 3 is a vertical section through the camera casing showing the releasing mechanism, in elevation, Fig. 4 is a vertical transverse section, Fig. 5 is a section through the winding mechanism, Fig. 6 is a composite sectional view showing the coöperation between the cable shutter release and film release device, Fig. 7 is a detail perspective view, and Fig. 8 is another detail perspective view.

Referring more particularly to the drawings, 1 represents the shutter of a folding camera of well known type, and 2 represents the camera box or casing. Within the box 2 are arranged the winding spool 3 and the feeding spool 4 across which the film 5 is extended. One margin of the film 5 is provided with a plurality of apertures 6, one of the apertures 6 appearing opposite each of the exposure sections 7 of the film. The film is automatically wound upon the spool 3 after it is released, through the influence of a coil spring 8 which is mounted upon a spindle 9 within a casing 10 which is fitted in the present showing, upon the side of the camera box 2. The spindle 9 also carries a gear wheel 11 which meshes with the gear wheel 12 mounted upon the latch pin 13, said latch pin 13 carrying upon its inner end a key 14 which engages the usual transverse slot in the end of the spool 3. The pin 13, furthermore, has a head 15 by means of which the pin may be manipulated, and the pin is forced inwardly by means of a coil spring 16 which surrounds the pin 13 and bears between the gear 12 and a fixed part of the camera box or casing. A key 17 outside of the spring housing provides a means for winding the spring in order to prepare the mechanism for its automatic action.

Within the casing or camera box there is mounted a housing 18, the latter being preferably secured to the rigid frame 19 which surrounds the exposure opening and back of which the film 5 rides. The housing 18 is so shaped that it stands away from the frame 19 as a comparatively high narrow structure between whose opposing walls is mounted a pawl 20 having the finger 21. The finger 21 normally projects through an opening or slot 22 in the frame 19, under the influence of a spring 23, the finger 21 furthermore being of the proper length to engage the opening 6 in the film strip 5. Connected into the lower end of the housing 18 is the tubular support 24 of a cable connection 25, the end of the latter being connected to the lower or oscillatory end of the pawl 20. The opposite end of the support 24 is connected into a three-armed fitting or housing 26 within which a trip or trigger 27 is pivotally mounted, to which the opposite end of the cable 25 is connected. The housing 26 is an insert into the cable support or covering 28, which is connected to the shutter release mechanism, and carries the shutter release cable 29 which is operated in the usual manner by means of a spring positioned push-button 30 upon the free end of the covering 28. The cable 29 passes through the alined arms 31 of the housing 26, and within the latter carries the wedge shaped head 32 which is positioned adjacent the nose 33 of the trigger 27. The coöperation of the head 32 and the trigger 27 is such that when the cable 29 is pushed inwardly so as to open the shutter 1, the head 32 will ride by the trigger 27 without disturbing the latter, but upon the return movement of the cable 29 under the influence of the spring 34, the squared face of the head 32 will strike below the nose 33, thereby tripping the trigger 27 to draw the cable 25 with the result that the finger 21 of the pawl 20 is withdrawn from the opening 6 in the film 5, so that the latter is released to the influence of the spring 8. The retraction of the finger 21 obviously, is momentary, and as soon as the head 32 has ridden off of the point of the nose 33, the spring 23 throws the finger 21 into contact with the film surface again, so that as soon as the next opening 6 in the film strip comes below the finger 21 the latter will be snapped into engagement therewith so as to lock the film in position for the next exposure.

By means of the mechanism which has been described, the film is automatically positioned for the next exposure, without the necessity of any manual effort on the part of the operator. Furthermore, the film is positioned without thought of the operator, so that all danger of making double exposures upon a film section is eliminated, since the film is released instantaneously after an exposure is made, and automatically assumes the proper position for the next exposure.

What we claim as our invention is:—

1. In a film camera having a film carrying strip the combination with a shutter and a reciprocatory member operable in one direction of movement to release the shutter, of means for engaging and locking the film carrying strip at successive times against movement, means for moving the film carrying strip when released by the locking means and means operable by said reciprocatory member during its passive movement, for momentarily moving and holding the locking means out of active position.

2. In a camera in which is employed a strip for carrying the sensitive coating, the strip being constructed for locking engagement of a lock therewith, the combination of a shutter, potential means for moving the strip, a latch movable into and out of locking engagement with the strip, a reciprocatory member adapted in one direction of movement to release the shutter, means for retracting the latch momentarily, means carried by the reciprocatory member for operating the latch retracting means during passive movement of said member with respect to the shutter, and means for returning the latch when the retracting means is released.

3. In a camera having a film carrying strip the combination with a shutter and a releasing mechanism therefor including a reciprocatory cable, of a pivoted latch for engaging and holding the film carrying strip against movement, means for urging the latch normally to active position, means for retracting the latch and means carried by the cable for engaging and operating the retracting mechanism upon movement of the cable in a direction passive with respect to the shutter release and potential means for moving the film when released by the latch.

4. In a camera having a film carrying strip the combination with a shutter and a releasing mechanism including a reciprocatory cable having a tripping member, of a pivoted latch disposed to engage and hold at times the film carrying strip, a trip member pivotally mounted in position for engagement and operation by said member carried by the cable during movement of the cable in a direction passive with respect to the shutter release, connections between the pivoted trip and the latch for moving the latter to film releasing position and potential means for automatically moving the strip when released.

In testimony whereof, we affix our signatures in the presence of two witnesses.

MICHAEL L. DUMAREST.
CHARLES D. FISCHER.

Witnesses as to Michael L. Dumarest:
WALTER S. BIGGERSTAFF,
CLARENCE SUMMERS.

Witnesses as to Charles D. Fischer.
JOHN M. DUNN,
JAMES RYAN.